United States Patent [19]

McLean

[11] Patent Number: 5,471,783
[45] Date of Patent: Dec. 5, 1995

[54] TREE GUARD

[76] Inventor: Ian McLean, 3 Flavel Place, Woodforde, SA 5072, Australia

[21] Appl. No.: 120,864
[22] Filed: Sep. 14, 1993
[51] Int. Cl.$^6$ .................................................. A01G 13/00
[52] U.S. Cl. .............................. 47/30; 138/166; 229/4.5
[58] Field of Search ................................. 47/30, 300, 33; 229/4.5; 138/166

[56] References Cited

U.S. PATENT DOCUMENTS

| 1,017,920 | 2/1912 | Stemmes | 138/166 |
|---|---|---|---|
| 1,548,682 | 8/1925 | Gulin | 47/30 |
| 3,208,478 | 9/1965 | Balnes | 138/166 |
| 4,647,491 | 3/1987 | Ireland | 47/33 |
| 5,222,325 | 6/1993 | Angus | 47/30 OT |

FOREIGN PATENT DOCUMENTS

| 4261358 | 4/1959 | Australia . | |
|---|---|---|---|
| 3317778 | 8/1979 | Australia . | |
| 5484486 | 9/1986 | Australia . | |
| 97853 | 10/1929 | Czech Rep. | 47/30 OT |
| 2104366 | 3/1983 | United Kingdom | 47/30 OT |
| 2129664 | 5/1984 | United Kingdom | 47/30 OT |
| 01904 | 4/1987 | WIPO | 47/30 OT |

Primary Examiner—Henry E. Raduazo
Attorney, Agent, or Firm—Gordon L. Peterson

[57] ABSTRACT

A tree guard for young trees, seedlings, sapling and other plants such as vines which can be laid flat for storage and rolled into a cylinder for placing around a tree. The guard may include tapes for holding by means of a stake and light and air admission holes. The guard may be of easily decomposable material or may be reusable.

20 Claims, 4 Drawing Sheets

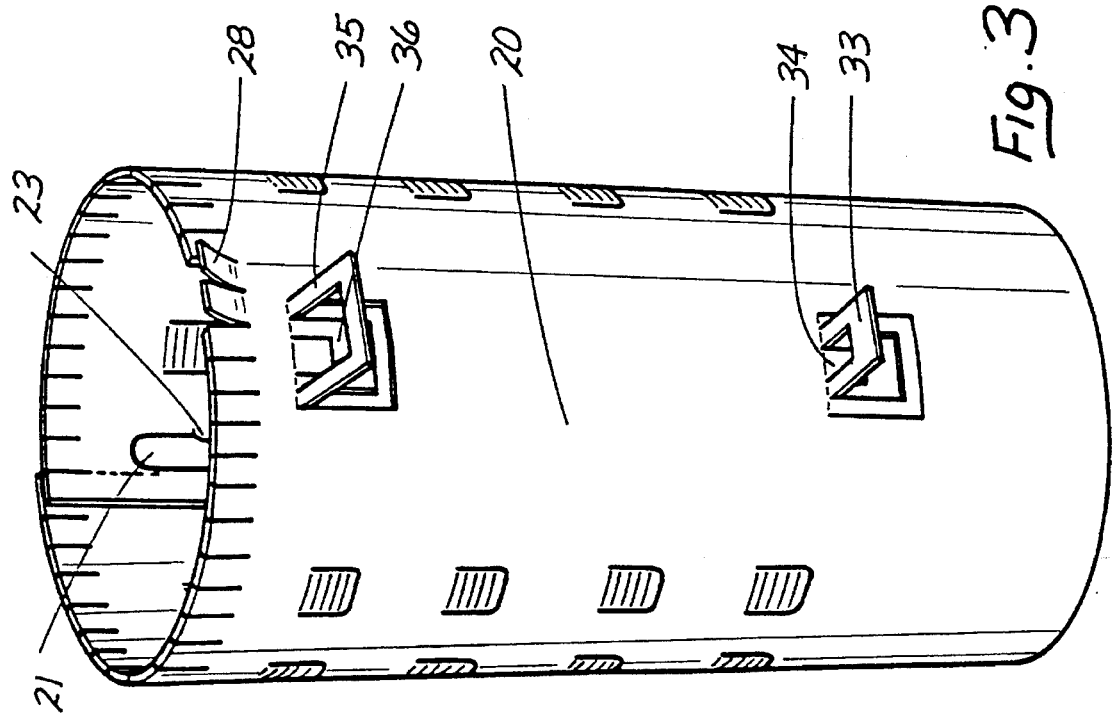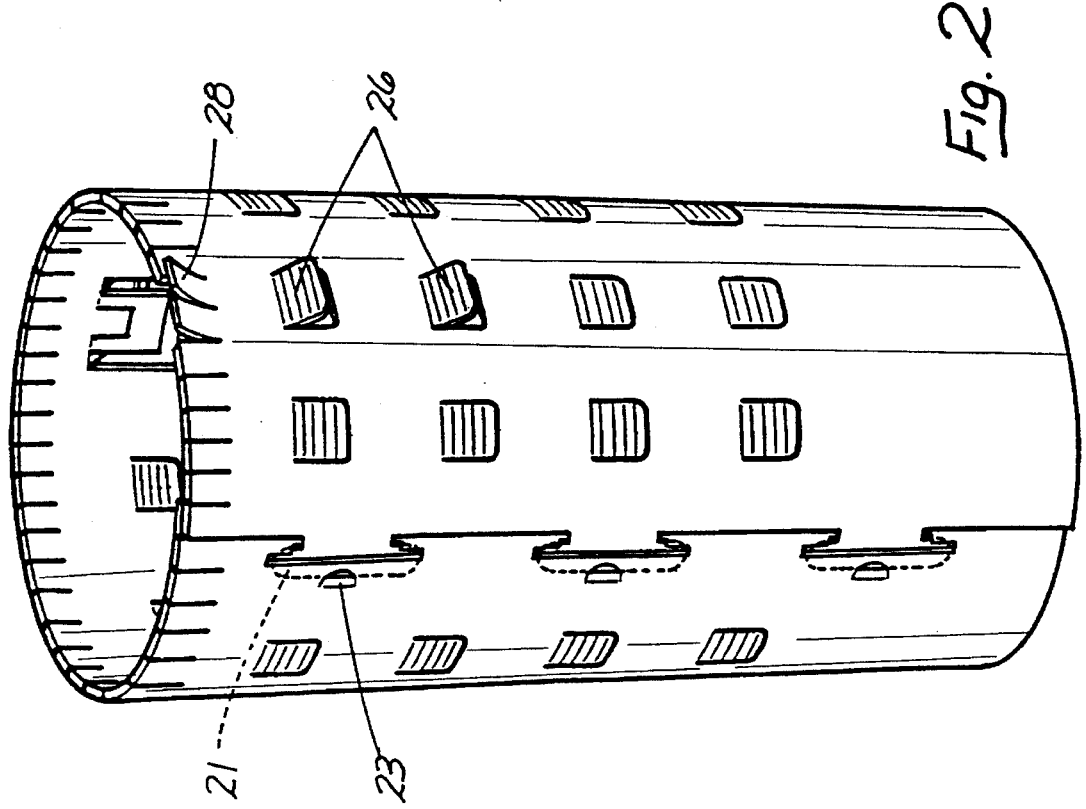

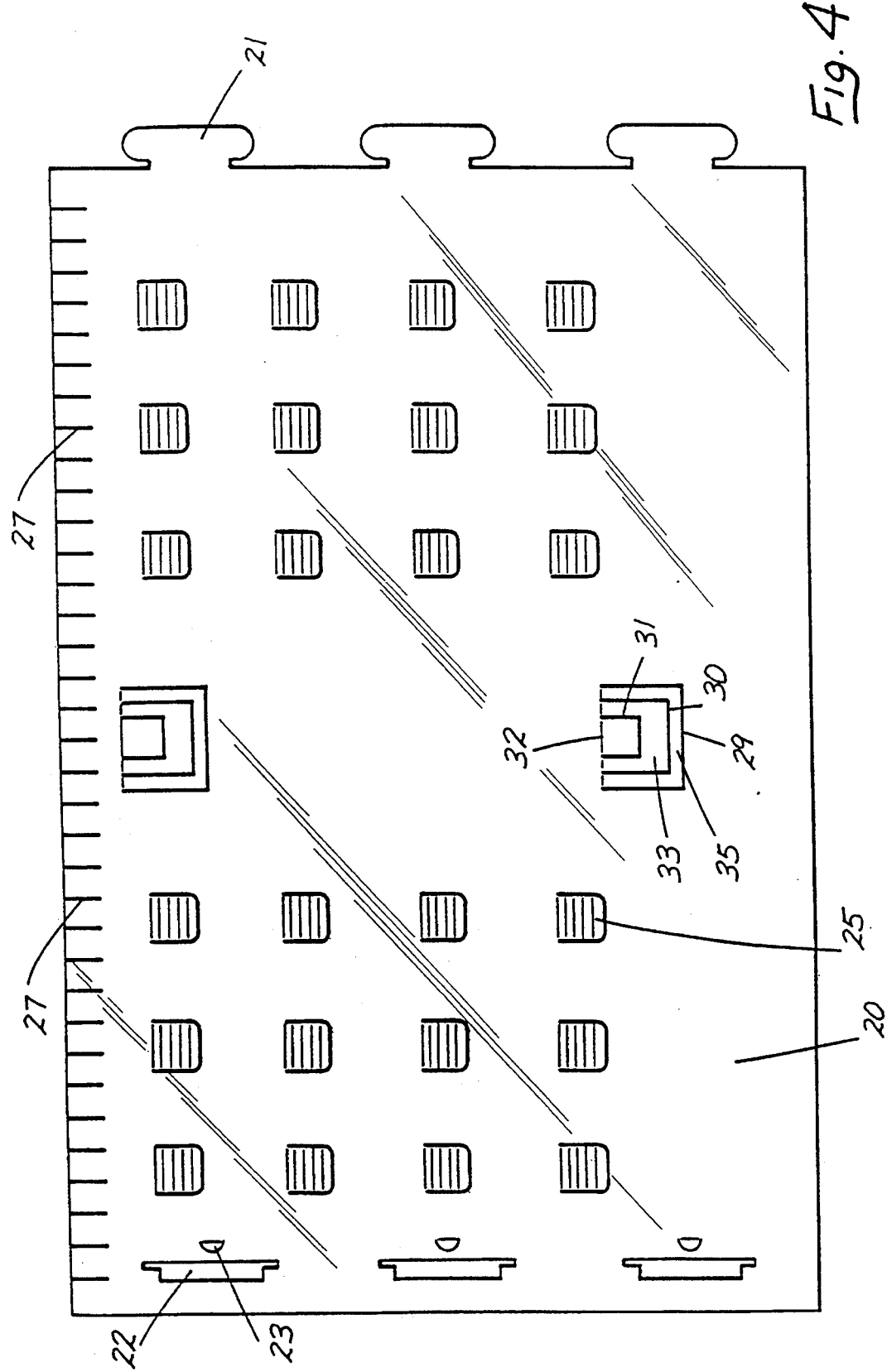

TREE GUARD

BACKGROUND OF THE INVENTION

This invention relates to tree guards of a type useful for protecting and training the growth of plants during their earlier growth stages.

Guards for this purpose have been known for a long time.

One guard has been made from a translucent material and has been formed into a cylindrical shape and the meeting edges welded together to form thereby an article that is permanently of such a shape.

The problem with such an arrangement is that in order to remove this from a tree after it is grown, it will normally be necessary to cut the guard material from bottom to top to effect such removal.

Besides being time consuming, this process also substantially destroys the guard for any further use.

In another prior art device, tabs are cut from the material to project outwardly with apertures therethrough through which a stake can be extended to hold the then tubular shape guard.

In order to hold the planar material in a tubular form there are provided tabs which are adapted to bend about substantially horizontal axes and then the tabs project through mutually aligned slots in a then facing wall of the material the tab incorporating the aperture through which the stake is then to extend.

There are several problems with this particular arrangement. A first problem is that in order to secure the tubular guard a stake must be extended through the respective apertures in the tabs. If temporary access to the plant is required, the stake holding the guard must be first removed or the guard must be slid fully along any stake in order to open the guard.

If the plant has already developed above the guard, this is no longer practical and in very many instances, removal of the stake is very time consuming and difficult especially if there are large numbers involved and it makes this type of guard difficult to use in practice. Even more to the point however, the shape of the guard providing this function requires a full wall to be overlapping another wall in order to have this type of locking and this makes such a guard somewhat expensive as compared to possibly other solutions.

The problem to which this invention is directed then is to provide a guard suitable for trees and other small bushes at the commencement of their growing periods which is both economic to manufacture and install, and can be manipulable and effectively reusable after use in respect of conventional applications.

BRIEF SUMMARY OF THE INVENTION

The invention in one form can be said to reside in a tree guard arrangement comprised of a growing plant, a sheet of flexible translucent plastics material formed into a straight tubular shape and held in the tubular shape by part of the sheet on a first side of adjoining sides of the tubular shape, interlockably engaging with part of the sheet on the other side of the adjoining sides of the tubular shape, at least two tabs, comprised as a part of the sheet of plastics material, each projecting outwardly from the tubular shape and aligned so that an aperture in the first tab is aligned with an aperture in the second tab so that a straight stake passing jointly through the respective apertures will be able to be aligned in parallel with an elongated alignment of the tubular shape, the tabs being separated a distance from the adjoining sides of the tubular shape, the tubular shape being located with a lower end embedded within soil and so as to surround the growing plant so that the plant is extending up into the tubular shape.

By having the respective sides of the tubular shape interlockably engaging thereby implicitly able to be unlocked, this allows for the material to be temporarily released from being retained in the tubular shape and therefore this allows the tubular shape to be either temporarily or permanently removed without damage from extending in a guarding direction around the growing plant which results in very significant improvements in the way in which plants can be temporarily examined, or be released from the surrounding guard without the surrounding guard having to be destroyed.

It has been discovered further that with this arrangement, because the tubular sides are attempting to force themselves back into a planar shape, the tube tends to bulge between interlocking parts with the result that this leaves apertures in this vicinity and this has been found to be especially beneficial to plants for assisting hardening of the plant.

This effect can be accentuated by having additional openable apertures within the flexible material so that as desired, apertures which are distributed through the tubular member can be open or closed with an integral tab.

The size and shape of such additional apertures with their attendant tabs is selected so that these are not so big as to allow rabbits or other smaller animals to eat the plant therethrough while at the same time providing sufficient opening for allowing ample air through there.

In preference, the part of the first side of the interlockably engaging shapes comprises at least one tab and the part of the sheet on the other side of the adjoining sides of the tubular shape includes a receiving aperture. It has been found that with a relatively simple interlocking shape, the regular movements caused by the action of wind can be such as to cause this relatively simple arrangement to come apart so a second interlocking effect can be used to additionally secure the one tab to the receiving aperture of the other side.

In a further form therefore the invention can be said to reside in a tree guard for a small plant, sapling or bush to be used during the early growth period of a tree or bush comprising a sheet of flexible material adapted to be formed into a tubular body and locking tabs and cooperating tab receiving sockets incorporated into the respective joining ends of the sheets of the flexible material, whereby the tree guard can be supplied in a flat unformed condition and be formed into the tubular shape on site by means of a locking tab mating with a corresponding tab receiving socket.

There may be a further locking tab associated with each socket so that when the first locking tab is inserted into the socket the end of the tab is received in a further tab to prevent it moving and working loose perhaps during strong windy weather which may blow onto the tree guard.

The sheet material may be of a material which is sufficiently permanent such the tree guard is re-useable.

Alternatively the sheet material from which the tree guard may be made may be a material which will decompose after about perhaps 1 to 2 years weather exposure so that there is no necessity to remove all the tree guards when the trees get to a reasonable size. Such a sheet material may be cardboard or plastics material. If a cardboard material it may be coated with wax or plastics material so that it can be protected for a while but will break down to leave the tree bare at a size where it is no longer endangered by vermin.

If the sheet materials is plastics material it may be a material without UV stabilisers so that in time it will decompose or it may be a plastics material incorporating agents which will cause it to decompose after a certain amount of weathering or bacterial attack.

With either embodiment the sheet material may be provided with a plurality of perforations to allow light and water to reach the growing tree of shrub. Such perforations may extend perhaps around three of four sides of the tubular body so that the side without perforations can be directed towards prevailing wind to prevent wind damage to the tree.

Alternatively the material may be translucent or transparent to allow light to get to the tree.

In one preferred embodiment the perforations may include tabs which close the perforations so the amount of opening or closing of the perforations can be selected.

There may be provided perhaps on the side of the tubular body without perforations at least two apertured tabs extending from the body, the tabs being positioned on the body to be substantially vertically aligned when the tree guard is in use with each tab having an aperture for an insertion of a stake to support the tree guard.

There may be separate tabs for small and large stakes or the large and small tabs may be incorporated or nested together.

In one preferred embodiment the tree guard may be provided on the top of the tubular shape with a plurality of vertical slits which enable the sheet material to fold back around the upper periphery of the tubular material so that as a tree grows larger its bark will not be damaged by the upper edge of the tubular material but the upper material will fold out to provide a more gentle surface for the growing tree.

In an alternative form the invention may be said to reside in a tree guard comprising a substantially tubular body comprised of an impervious material and having a plurality of perforations on at least one face thereof and at least one face without perforations whereby the guard may be set up so as to direct the face without perforations to a prevailing wind. This will prevent damage to the tree by wind blown sand and debris.

The side of the tree guard which is intended to be directed to a prevailing wind may be provided with tabs through which a stake to support the tree guard may be driven.

The tree guard may be manufactured from a translucent material or may be manufactured from a opaque material with sufficient of the perforations or apertures being provided to allow light and air and water to reach the growing trees. The tubular material may be cylindrical or square or any other convenient shape and may be made from a flat sheet of material folded or rolled into the desired shape. The advantage of a singe flat sheet of material which can be folded or rolled into the desired shape is that it may be easily stacked for storage before installation on the tree.

As with the earlier embodiment the upper end of the tree guard in use may have its edge relieved by means of a number of slots which will enable portions of the upper part to fold out if a tree grows against them thereby preventing damage to the bark of the tree.

In an alternative form the invention may be said to reside in a tree guard comprising a substantially tubular body and at least two tabs extending from the body, the tabs being positioned on the body to be substantially vertically aligned when the tree guard is in use, each tab having an aperture for insertion of a stake to support the tree guard.

There may be provided on the tree guard two sets of tabs, one for a large stake and one for a small stake.

Alternatively the large and small tabs may be nested together so that the inner periphery of the larger tab forms the outer periphery of the smaller tab.

In an alternative form the invention may be said to reside in a tree guard having a substantially cylindrical or tubular body with an upper end of the body having relieving means so that the sharp edge of the body will not damage a tree which grows through the body. Such a relieving means may be a number of slits which extend down a short distance which will enable the top edge of the body to fold out as a tree is growing past it so that damage does not occur to the tree.

In an alternative form the invention may be said to reside in a tree guard adapted to be positioned around a growing tree with the material of the tree guard being of a composition which will decompose after a desired period of weathering thereby reducing the necessity for removal of the tree guard as the tree grows older.

In a preferred embodiment the material of the tree guard may be cardboard treated with either wax or plastics material so that it will not decompose immediately but will decompose during use of perhaps 1 or 2 years. Such cardboard may also incorporate chemicals which will make the cardboard not tasty to vermin so that it will be not damaged by rabbits and the like.

In an alternative form the tree guard may be manufactured from plastics material which plastics material either does not incorporate UV stabilisers so that it will be broken down by the sun over a period of time or the tree guard may include components which will enable bacterial breakdown of the tree guard over a period of perhaps 1 or 2 years.

A feature of the arrangement described is that additional openings are effected between the respective adjoining sides and between their tabs.

It has become a relatively common procedure in the growing of vines that the young vine is tied by a cord to an overhead wire.

In order to either locate a guard of the type being discussed around such a vine when so tied, it is now apparent that it is essential to have this openable and then closable in a manually lockable way which further has the advantages of being able to unlock the guards for subsequent reuse in another application.

This then generally describes the invention but to assist with understanding the invention reference will be now made to the accompanying drawings which show preferred embodiments of the preferred invention.

DETAILED DESCRIPTION

In the drawings:

FIG. 2 shows one view of a tree guard according to another embodiment of the invention, FIG. 3 shows an alternative view of the embodiment shown in FIG. 2, FIG. 4 shows the embodiment shown in FIGS. 2 and 3 but in a flattenedout form.

Figure 1:
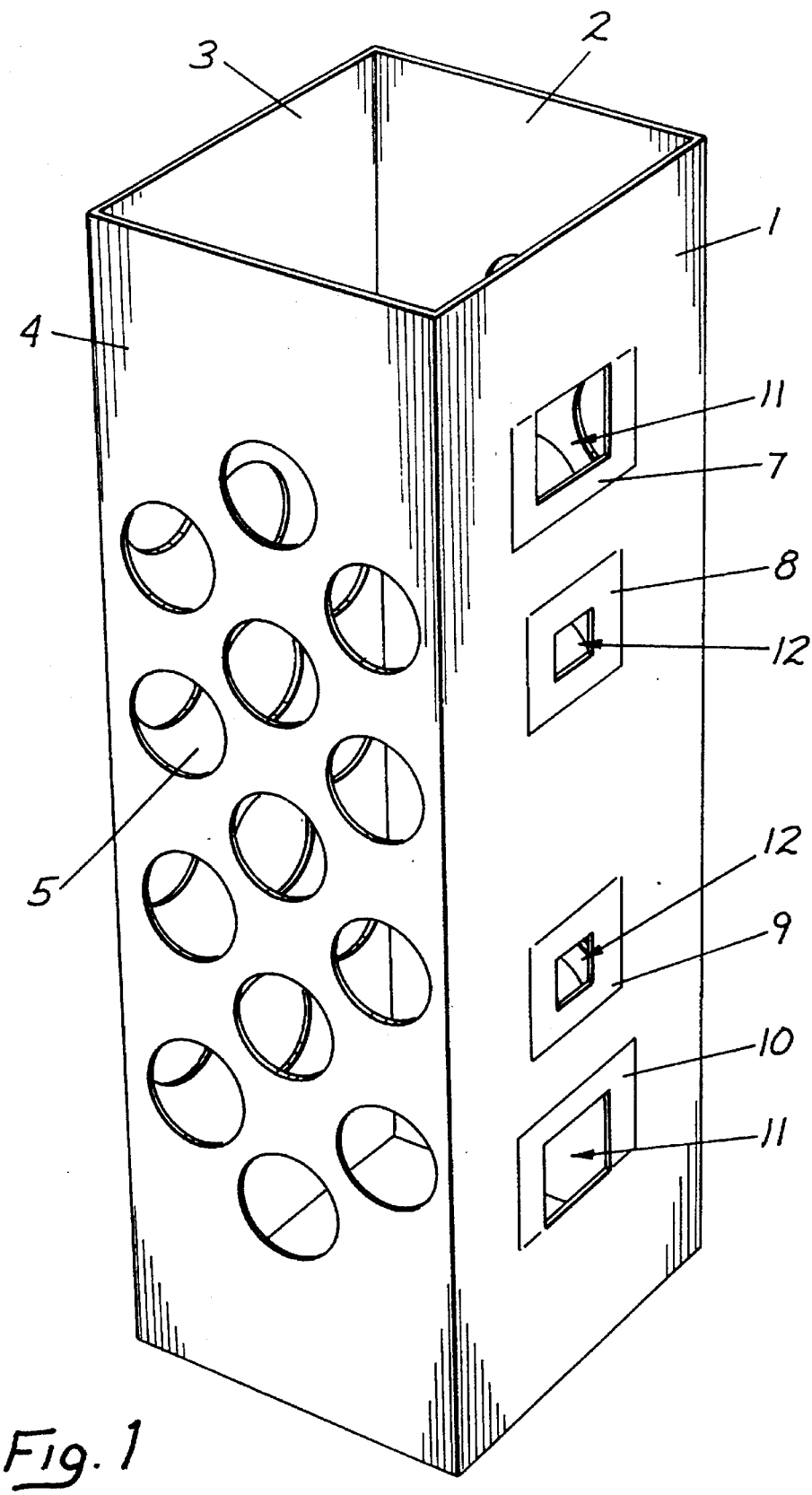
FIG. 1 shows a first embodiment of a tree guard according to this invention.

Now looking more closely to the drawings and in particular the embodiment shown in FIG. 1 it will be seen that the tree guard 1 comprises a tubular body in this case a square cross-section body having three faces 2, 3 and 4 which have perforations 5 in these faces and a further face 6 without perforations. There is provided in the face 6 tabs 7, 8, 9 and 10. Tabs 7 and 10 are adapted to be folded out substantially at right angles to the face 6 so that a stake may be inserted through the apertures 11 to support the tree guard. Tabs 8 and 9 may be folded out at substantially right angles to the face 6 so that a thinner stake may be inserted through the apertures 12 to support the tree guard.

The embodiment shown in FIGS. 2, 3 and 4 is manufactured from a flat sheet of material 20 which is rolled into a cylindrical shape as shown in FIGS. 2 and 3. Locking tabs 21 are provided on one end of the sheet material 20 and tab receiving sockets 22 are provided at the other end of the sheet material 20. An extra locking tab 23 is provided in the sheet material adjacent each socket 22 and as can be seen in FIG. 2 the locking tab 21 extends under the locking tab 22 to securely lock the cylindrical form. In this embodiment the perforations 25 in the body of the sheet material 20 may be pushed opened by pushing on closure tabs 26 as shown in FIG. 2 or may be left shut depending upon the amount of weather it is desired to be directed onto the bush contained within the tree guard. If the tree guard is made from a translucent material it will still receive enough light.

A number of slits 27 may be provided along the upper edge of the tree guard according to this invention and as shown in FIGS. 2 and 3 individual tabs formed between the slits 27 may be folded out as shown at 28 so that as a tree grows out through the top of the tree guard the top edge may be pushed back and will not damage the tree.

The tabs provided on one face of the tree guard according to this invention may be used to enable a stake to fasten the guard to the ground. In this embodiment large and small tabs are nested together. The tab arrangement consists of a set of three U-shaped cuts 29, 30 and 31 nested together and having a substantially similar top folding edge 32. If a small stake is to be used then the tab portion 33 between the cuts 30 and 31 is lifted out as shown at the lower tab in FIG. 3 and the stake inserted through the aperture 34 formed thereby.

If a large stake is to be used then the tab 35 forms between the U-shaped cuts 29 and 30 may be lifted out so that a large stake may be inserted through the aperture 36.

Figure 5:
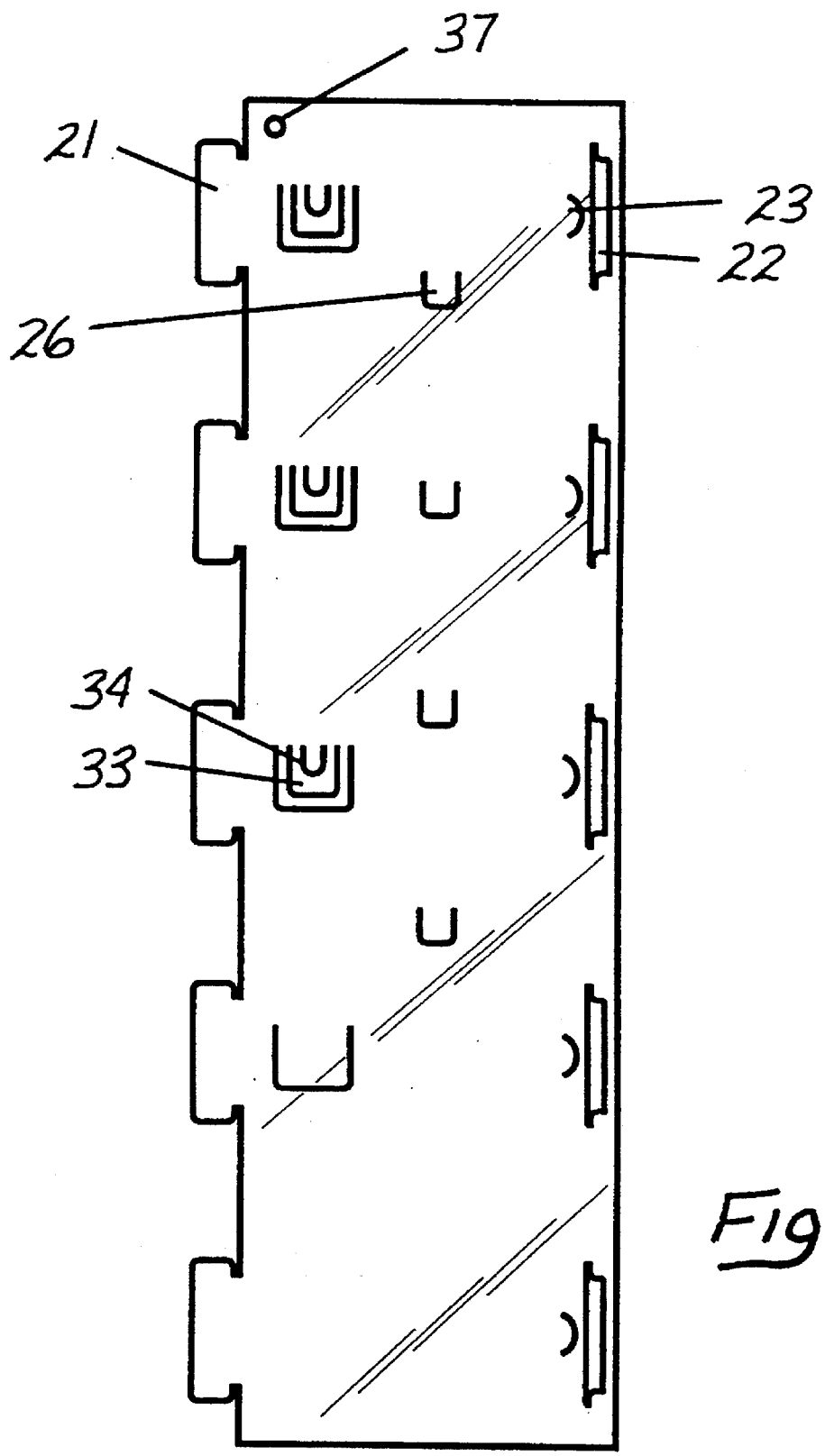
FIG. 5 is a plan view of a further blank to be formed into a tree guard showing a different arrangement of elements constituting the tree guard.

Referring to the blank as shown in FIG. 5, this illustrates a different arrangement of the elements constituting the tree guard with the addition however of an aperture 37 through which a string, cord or wire can be passed which can be used to locate the tree guard relative to a cross wire or tie.

It will be realised that either of the two embodiments shown of this invention may be constructed from either plastics material or cardboard as discussed earlier with properties which will enable to decompose over a certain period of time.

I claim:

1. A tree guard for a small plant, sapling or bush to be used during the early growth period of a tree or bush comprising a sheet of flexible material adapted to be formed into a tubular body and locking tabs having an attached portion and a distal end and cooperating tab receiving sockets incorporated into the respective joining ends of the sheet of the flexible material, whereby the tree guard can be supplied in a flat unformed condition and be formed into the tubular shape on site by means of a locking tab mating with a corresponding tab receiving socket and including an extra locking tab associated with each socket so that when the first locking tab is inserted into the socket the distal end of the tab is received in said extra locking tab to prevent it moving and working loose.

2. A tree guard for a small plant, sapling or bush to be used during the early growth period of a tree or bush comprising a sheet of flexible material having a substantially rectilinear shape in plan and adapted by reason of this shape and the characteristics of the flexible material to be formed into a tubular body to act as a tree guard and having locking tabs at one of the ends of the rectilinear shape, each of said locking tabs having an attached portion and a distal end, said flexible material further having cooperating tab receiving sockets incorporated in the oppositely located end of the sheet of flexible material and an extra locking tab associated with each cooperating tab receiving socket, whereby the tree guard can be supplied in an unformed condition and be formed into the tubular shape on site by means of a locking tab mating with a corresponding tab receiving socket and with each of the extra locking tabs receiving the distal end of the associated locking tab.

3. A tree guard as defined in claim 2 wherein each of the extra locking tabs is located inwardly of the associated socket and adjacent such socket.

4. A tree guard as defined in claim 3 wherein the sheet of flexible material is a plastic material including UV stabilizers.

5. A tree guard as defined in claim 2 wherein the sheet of flexible material is a plastic material including UV stabilizers.

6. A tree guard as defined in claim 3 wherein the sheet of flexible material is provided with a plurality of perforations to allow light and water to reach a growing tree or shrub.

7. A tree guard as defined in claim 2 wherein the sheet of flexible material is provided with a plurality of perforations to allow light and water to reach a growing tree or shrub.

8. A tree guard as defined in claim 7 wherein the perforations are located so as not to be available on at least one side of the tubular shape so that the side without perforations can be directed towards the direction of prevailing wind.

9. A tree guard as defined in claim 8 wherein the sheet of flexible material is translucent to allow useful light to pass therethrough to assist growth of plants within the guard.

10. A tree guard as defined in claim 2 wherein the sheet of flexible material is translucent to allow useful light to pass therethrough to assist growth of plants within the guard.

11. A tree guard as defined in claim 6 including closure tabs adjacent at least some of the perforations so that the amount of opening or closing of a perforation can be changed by bending of the associated closure tab.

12. A tree guard as defined in claim 11 including at least two apertured tabs extending from the body, a first of the tabs being positioned to be substantially vertically aligned with at least one other of the tabs when the tree guard is in use so that the tabs provide aligned apertures for insertion of a stake mutually therethrough to support the tree guard.

13. A tree guard as defined in claim 2 including at least two apertured tabs extending from the body, a first of the tabs being positioned to be substantially vertically aligned with at least one other of he tabs when the tree guard is in use so that the tabs provide aligned apertures for insertion of a stake mutually therethrough to support the tree guard.

14. A tree guard as defined in claim 13 including separate sets of apertured tabs for small and large stakes, respectively.

15. A tree guard as defined in claim 2 wherein the tree guard has a plurality of slits in an upper periphery of the sheet of material which enable the sheet of material to fold back around the upper periphery.

16. A tree guard for a small plant, sapling or bush to be used during the early growth period of a tree or bush comprising a sheet of flexible plastic material having a substantially rectilinear shape in plan and adapted to be formed into a tubular body to act as a tree guard and said sheet having locking tabs at one of the ends of the rectilinear shape and cooperating tab receiving sockets incorporated in the oppositely located end of the sheet of flexible material and an extra locking tab spaced from but adjacent each cooperating tab receiving socket and adapted to receive the associated locking tab.

17. A tree guard as defined in claim 16 wherein each of the extra locking tabs is located inwardly of the associated socket.

18. A tree guard as defined in claim 17 including at least two apertured tabs extending from the body, the tabs being positioned on the body to be substantially vertically aligned when the tree guard is in use.

19. A tree guard as defined in claim 17 including shape relieving means at an upper end of the tubular body so that the sharp edge of the body will not damage a tree which grows through the tubular body.

20. A tree guard as defined in claim 19 wherein the shape relieving means comprises a number of slits which extend down a short distance from the top edge of the body which will enable the top edge of the body to fold out as a tree is growing past it so that damage does not occur to the tree.

* * * * *